United States Patent
Vekiarides et al.

(10) Patent No.: US 9,684,594 B2
(45) Date of Patent: Jun. 20, 2017

(54) WRITE BACK COORDINATION NODE FOR CACHE LATENCY CORRECTION

(71) Applicant: ClearSky Data, Boston, MA (US)

(72) Inventors: Lazarus Vekiarides, West Roxbury, MA (US); Daniel Suman, Chapel Hill, NC (US); Janice Ann Lacy, Shrewsbury, MA (US)

(73) Assignee: ClearSky Data, Boston, MA (US)

( * ) Notice: Subject to any disclaimer, the term of this patent is extended or adjusted under 35 U.S.C. 154(b) by 264 days.

(21) Appl. No.: 14/332,469

(22) Filed: Jul. 16, 2014

(65) Prior Publication Data

US 2016/0019146 A1    Jan. 21, 2016

(51) Int. Cl.
| | |
|---|---|
| *G06F 12/08* | (2016.01) |
| *G06F 12/0811* | (2016.01) |
| *G06F 12/0806* | (2016.01) |
| *G06F 12/0897* | (2016.01) |
| *G06F 12/10* | (2016.01) |

(52) U.S. Cl.
CPC ...... *G06F 12/0811* (2013.01); *G06F 12/0806* (2013.01); *G06F 12/0897* (2013.01); *G06F 12/10* (2013.01); *G06F 2212/283* (2013.01); *G06F 2212/62* (2013.01)

(58) Field of Classification Search
CPC ........... G06F 12/0897; G06F 17/30906; H04L 67/2842; H04L 67/1097
See application file for complete search history.

(56) References Cited

U.S. PATENT DOCUMENTS

| | | | |
|---|---|---|---|
| 7,130,956 B2 | 10/2006 | Rao | |
| 7,130,957 B2 | 10/2006 | Rao | |
| 7,673,099 B1 | 3/2010 | Beaverson et al. | |
| 7,870,106 B1 | 1/2011 | Nguyen et al. | |
| 8,095,577 B1 | 1/2012 | Faibish et al. | |
| 8,099,571 B1 | 1/2012 | Driscoll et al. | |
| 8,165,449 B2 | 4/2012 | Ludwig et al. | |
| 8,185,778 B2 | 5/2012 | Kilzer et al. | |
| 8,255,660 B1 | 8/2012 | Chatterjee et al. | |
| 8,271,974 B2 | 9/2012 | Mazhar et al. | |
| 8,438,361 B2 | 5/2013 | Goss et al. | |
| 8,473,690 B1 | 6/2013 | Condict | |
| 8,527,703 B1 | 9/2013 | Clark et al. | |
| 8,560,801 B1 | 10/2013 | Pendharkar et al. | |
| 8,661,068 B1 | 2/2014 | Seibel et al. | |
| 8,682,955 B1 | 3/2014 | Monden et al. | |
| 2010/0153415 A1* | 6/2010 | Muntz | H04L 67/1097 707/758 |
| 2010/0250858 A1 | 9/2010 | Cremelie | |
| 2010/0306253 A1 | 12/2010 | Perry et al. | |

(Continued)

OTHER PUBLICATIONS

Brandt et al., Efficient Metadata Managment in Large Distributed Storage Systems, Apr. 2003, IEEE, 11th NASA Goddard Conference on Mass Storage Systems and Technologies.*

(Continued)

*Primary Examiner* — Reginald Bragdon
*Assistant Examiner* — Thanh Vo
(74) *Attorney, Agent, or Firm* — Cesari and McKenna, LLP

(57) ABSTRACT

A coordinating node acts as a write back cache, isolating local cache storage endpoints from latencies associated with accessing geographically remote cloud cache and storage resources.

24 Claims, 10 Drawing Sheets

(56) References Cited

U.S. PATENT DOCUMENTS

| | | |
|---|---|---|
| 2010/0333116 A1 | 12/2010 | Prahlad et al. |
| 2011/0307659 A1* | 12/2011 | Hans .................... G06F 3/0613 |
| | | 711/114 |
| 2012/0066337 A1 | 3/2012 | Wu et al. |
| 2013/0117337 A1 | 5/2013 | Dunham |
| 2013/0159359 A1 | 6/2013 | Kumar et al. |
| 2013/0204849 A1 | 8/2013 | Chacko |
| 2014/0032850 A1 | 1/2014 | Phelan |
| 2014/0032856 A1 | 1/2014 | Avudaiyappan |
| 2014/0181402 A1 | 6/2014 | White |

OTHER PUBLICATIONS

International Search Report and Written Opinion mailed Feb. 23, 2016 for International Application Serial No. PCT/US2015/040708 filed by ClearSky Data on Jul. 16, 2015, 20 pages.

Robert Sedgewick et al., *Algorithms*, 4$^{th}$ Edition, Chapter 3.4 Hash Tables, 10 pages, retrieved from Internet: http://algs4.sc.princeton.edu/34hash/, Oct. 10, 2013.

Nikolas Askitis et al., "Cache-Conscious Collision Resolution in String Hash Tables," M. Consens and G. Navarro (Eds.): SPIRE 2005, LNCS 3772, pp. 91-102, 2005, 12 pages.

Kiran Dattani et al., "Data Tier Caching for SOA Performance—Injecting high performance into data services," Part of the Oracle Fusion Middleware Patterns article series, Feb. 2010, retrieved from Internet: http://www.oracle.com/technetwork/articles/soa/data-tier-caching-for-soa-101753.html, 8 pages.

\* cited by examiner

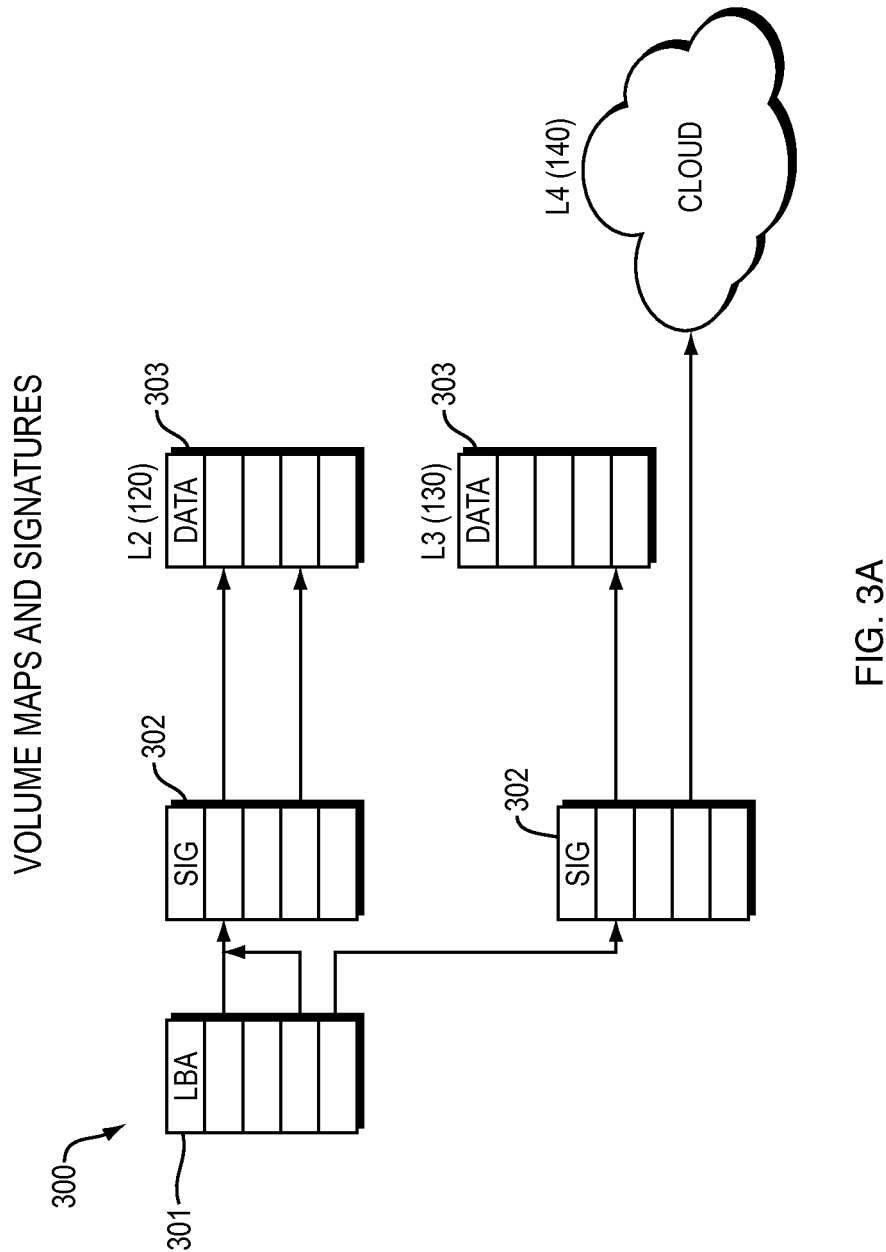

WRITE BACK COORDINATION NODE FOR CACHE LATENCY CORRECTION

BACKGROUND

Technical Field

This patent application relates to data processing, and in particular to coordination between local and cloud-based caching functions.

Background Information

A number of technology trends continue to impact the optimal design of data storage systems. Most every computing machine now includes one or more processors that implement one or more levels of caching. Enterprise level data processing installations also often install special purpose cache appliances dedicated to the task of caching less often accessed data to bulk storage devices accessible over a network. More recently, commercial cloud services accessible over Internet connections now serve as caches.

SUMMARY

Problems with Existing Solutions

While a variety of data processing equipment and services are now available to implement caching, various challenges arise when attempting to leverage local processor cache features, cache applicances, and access to cloud-based cache services.

Data storage systems should be coherent, consistent, and addressable by a namespace that is contiguous.

Many enterprise-level applications now also store virtual machine images, virtual machine disks (VMDKs) or application data tied to a virtual machine. It is often not practical or even possible to expect all of these data structures to be accessible in a primary storage cache all at one time. This also results in multiple operations to retrieve data from the cloud, which has an adverse effect on perceived response time to the users of the underlying applications.

In addition, it is desirable for primary data access to be bi-directional, for both read and write operations. But cloud storage interfaces do not typically offer consistent, predicable, or simple egress paths.

Existing solutions provide no seamless way for data to move back and forth between various physical cache equipment and cloud based services making expansion or cost-saving difficult.

Summary of Preferred Implementations

In an effort to resolve these issues, the systems and methods discussed below allow a data processing installation to seamlessly migrate from using physical storage endpoints to a cloud service for data caching. The systems and methods in effect provide a virtualized environment that allows primary data to exist both locally and in the cloud but yet appear to be a contiguously addressable, high performance data store. The approaches are local host agnostic, cloud service provider agnostic, secure and resilient.

In a preferred approach, a coordinating node creates virtual storage from a composite of local storage and cloud-based resources. The coordinating node preferably manages this virtual storage as one or more contiguous storage spaces. It may also perform functions such as optimizing, caching, de-duplicating and encrypting.

More specifically, a coordinating node functions as an interface to a Level 3 (L3) cache in a hierarchy of caches. The coordinating node is typically located in the same metropolitan region as the storage endpoints, where a metropolitan region is a 100 mile radius or so. The coordinating node and storage endpoints may be located much closer than that, such as in the same building or on the same campus of buildings. The coordinating node also acts as an access point to remote cloud storage services. The coordinating node furthermore operates as a write-back cache while serving as a global master for metadata to ensure a contiguous addressing scheme.

A caching appliance (or other storage endpoint) functions as an interface to a Level 2 (L2) cache. The L2 cache is located closer to the working store provided by Level 1 (L1) primary data processors. The L2 cache operates in write-through mode. The L2 cache is typically connected to the L3 cache via a dedicated high speed local network connection such as a 100 (gigabit Ethernet (GigE)) or other Local Area Network (LAN) connection.

In other aspects, the various level caches—L2, L3 and cloud—access data in logical blocks that fit into a globally contiguous logical address space. Each logical block thus has associated metadata that determines where the underlying physical block is located at a given time (or whether a physical block is even mapped to an actual location at a given time). The various units described above separate the primary data from this metadata. In particular, the amount of data stored in the L2 cache may be significantly larger than the amount of data stored in the L3 cache. However, the storage allocated for metadata for the various cache levels in the hierarchy may increase with distance from the primary store. Thus, the allocation of space for metadata may be decoupled and asymmetric to the allocation of storage for the corresponding data.

In still other aspects, the metadata may include a key or signature composed of a hash and associated unique discriminator. When a new block is to be written anywhere in the cache heirarchy, a hash is computed and then compared with existing hashes. If one or more duplicate hashes are found, the underlying blocks of data are compared for a data match. If a data match is found, the new block is assigned the same key value as the matching block. Otherwise the new block and the hash are assigned a new key with the same hash value but with a new unique discriminator. The unique discriminator may be a monotonically increasing number, a time stamp, or some other unique value that changes over time. In a preferred implementation, the initial determination of the hash may be by the L2 cache, but with discriminator determination being performed by the L3 coordinator node.

BRIEF DESCRIPTION OF THE DRAWINGS

The description below refers to the accompanying drawings, of which:

FIG. 3A is an example volume map and signatures with pointers to data stored at various cache hierarchy levels.

DETAILED DESCRIPTION OF AN
ILLUSTRATIVE EMBODIMENT

Figure 1:
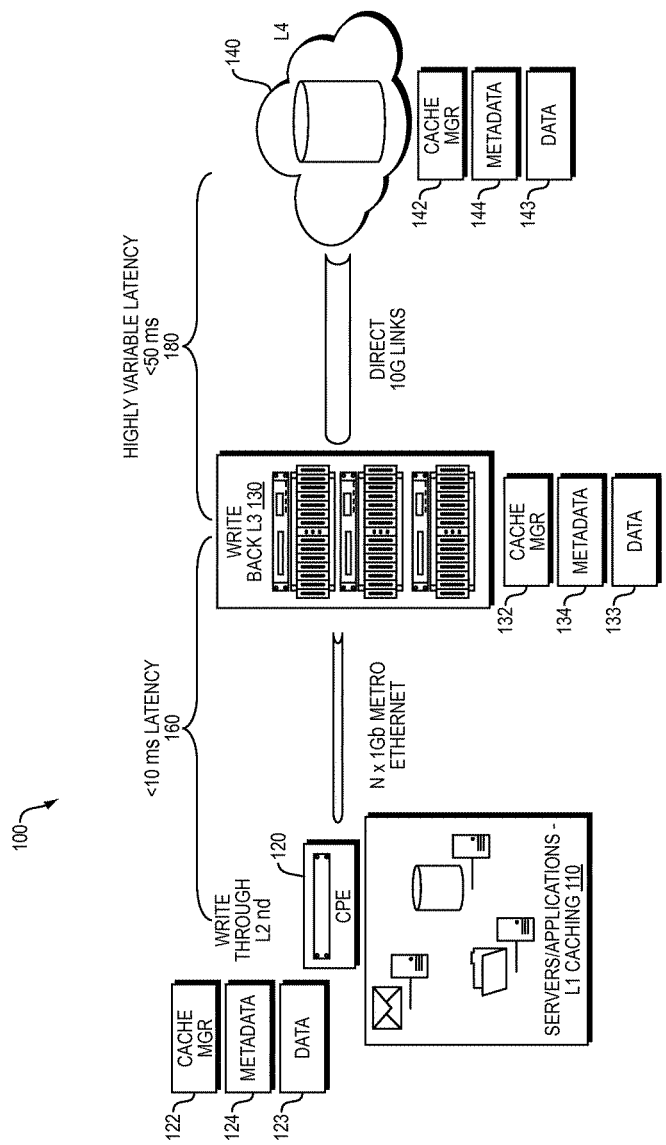
FIG. 1 is a high-level block diagram of a hierarchical caching system that includes a coordinating node.

Turning attention now to FIG. 1, there is shown a high-level view of the components of a system 100 that may be used to implement an apparatus and/or method to provide high performance coordinated caching. More particularly, the system 100 coordinates use of cloud storage resources 140 by a primary data store 110 operating as a Level 1 (L1) cache with at least two other hierarchical levels of cache including a Level 2 (L2) cache 120 and Level 3 (L3) cache 130.

The functional elements of the system 100 thus include a first level (L1) cache 110 encompassing processors operating with a primary data store. The L1 110 devices may typically include application servers, web servers, database servers, and other data processing devices. It should be understood that while these L1 devices 110 are initiators from the perspective of the caching system 100, the devices 110 may themselves include internal caching functions—for example, most microprocessor chips now include on-chip cache memories and most contemporary processor designs include one or more levels of on-board memory chips operating as Solid State Disk (SSDs) based caches. As such, many read and write requests may initially be satisfied locally at L1.

The system also includes Level 2 (L2) device(s) 120 which may be one or more storage endpoints such as a cache appliance. More generally, the L2 devices may be any other data processing equipment that serves as a cache for when the L1 devices 110 have more data to store than the L1 devices themselves can handle. The L2 devices each include one or more data processor(s) with local memory, local storage, and software. The L2 devices are programmed to operate as a write-through cache. That is, write operations are executed immediately by the L2 cache 120 from the perspective of the L1 devices 110, even if L2 120 does not presently have the requested data and has to hand off the write request to a further level in the hierarchy, such as L3 130 or even the cloud 140. Although a single block figure is shown for L2 device 120, it should be understood that there may be multiple peered L2 devices 120 represented by the single block.

Level 3 (L3) devices operate as a specialized cache coordinating node 130. The coordinating node 130 is a data processor with local memory and storage with caching software. The L3 node 130 operates as a write-back cache. That is, L3 is responsible for accessing cloud storage 140 as necessary to complete cache read and writes and ensure coherence between all levels in the cache hierarchy.

Cloud storage 140 may be accessed as a service, such as the S3 storage service offered by Amazon, or some other commercially available cloud storage service, operates as yet another cache level (L4). There may be more than one cloud storage service 140 used by the system 100. More generally, cloud storage 140 may be provided by any server or virtualized servers accessible to L3 over a wide area network connection such as the Internet. Such cloud storage may run on one or many connected computers at the same time, all functioning independently and appearing as a single physical device. It should also be understood that cloud storage 140 may be a private cloud accessible only via a private network and owned or operated by the same private entity that owns or operates the L2 and L3 caches.

Each of L2, L3, and L4 has an associated cache manager (122, 132, 142), data storage (123, 133, 143), and metadata storage (124, 134,144). The cache manager (122, 132, 142) located at each level includes software that controls the flow of data to and from the various levels in the hierarchy, as more fully explained below.

At least some of the devices disposed at different levels may also be geographically dispersed. In a typical implementation, the L2 cache 120 is located closest to the L1 initiator(s) 110 and is therefore preferably located on the same local area network as the L1 devices 110. This provides the highest possible speed and lowest latency—typically 10 milliseconds (ms) or less is desirable for such local connections 160.

The L2 120 and L3 130 devices may also be connected via a low latency local area network, for example 10 GigE or 100 Gigabit Ethernet (GigE) connections that provide relatively low latency. The L2 120 and L3 130 devices may typically be located in the same building, or in the same campus of buildings, or perhaps even at different locations in the same city accessible via a common Metropolian Area Network. It should be understood that other types of Local Area Network (LAN) technologies may be used.

L3 and L4 are however, typically located at a much longer distance away from one another that the L2 and L3 devices. L3 and L4 may be located in different cities or even different countries. L3 and L4 therefore typically must connect over a long-distance wide-area network. Due to this distance, these connections will exhibit a widely variable latency, ranging from 25 to 50 ms or even higher.

Consider also that a data access on a local server may take 1 ms, but that the corresponding data lookup on an Amazon S3 server farm may take 10 ms. Thus when an L2 cache miss occurs, if the data is located the cloud at L4, the total delay because of data lookup time in large server farms can be even higher than the 50 ms that the wide area connection itself represents.

In general, when each of the cache managers 122, 132, 142 receive a request to read or write data, they first check to see if the request can be satisfied locally by its respective cache 123, 133, 143. If not, then the request is passed to the next higher level in the hierarchy.

Each node maintains a fully de-duplicated local cache 123, 133, 143 with respective metadata 124, 134, 144. More particularly, the cache managers 122, 132, 142 located at each level use this metadata including a logical block address (LBA) map to determine whether data is available locally, or must be fetched or stored at some other level. As will be explained in greater detail below, the L3 cache 130 coordinates these LBA maps among the various levels to ensure consistency for the entire system 100.

In this scenario all managed data is eventually migrated to the cloud provider 140. At least three levels are provided in a cache hierarchy, a "warm" level provided by the coordinating node 130, a "cold" level provided by the cloud level 140, and a "hot" level provided by the L2 cache; the local appliance at L2 need only cache the hottest data set.

1. L3 Coordinating Node

The L3 node 130, referred to here as the coordinating node, coordinates read and write operations, ensures consistency in the LBA maps used by the various levels, and guarantees to satisfy write requests from lower levels of the hierarchy. The L3 cache thus performs "latency correction" from the perspective of L2 when the data accessed is in the cloud 140. In other words, when the L2 cache 120 cannot directly satisfy a request from an L1 initiator, it simply passes the request to L3 over the high speed local connection and L1 will only experience the latency associated with that local connection.

The write back feature of coordinating node 130 thus eliminates the high variability write operations that would otherwise be experienced via the connection between L2 and the cloud at L4. The experience instead becomes very predictable from the perspective of both L1 and L2.

The L3 node also maintains master logical block address (LBA) maps and coordinates the distribution of LBA map information between the L2 cache 120, the cloud 140 and itself. That is, L3 is primarily responsible for ensuring that all LBA's are correctly mapped across all elements of the system such as by informing the other levels of the current mappings.

Figure 2:
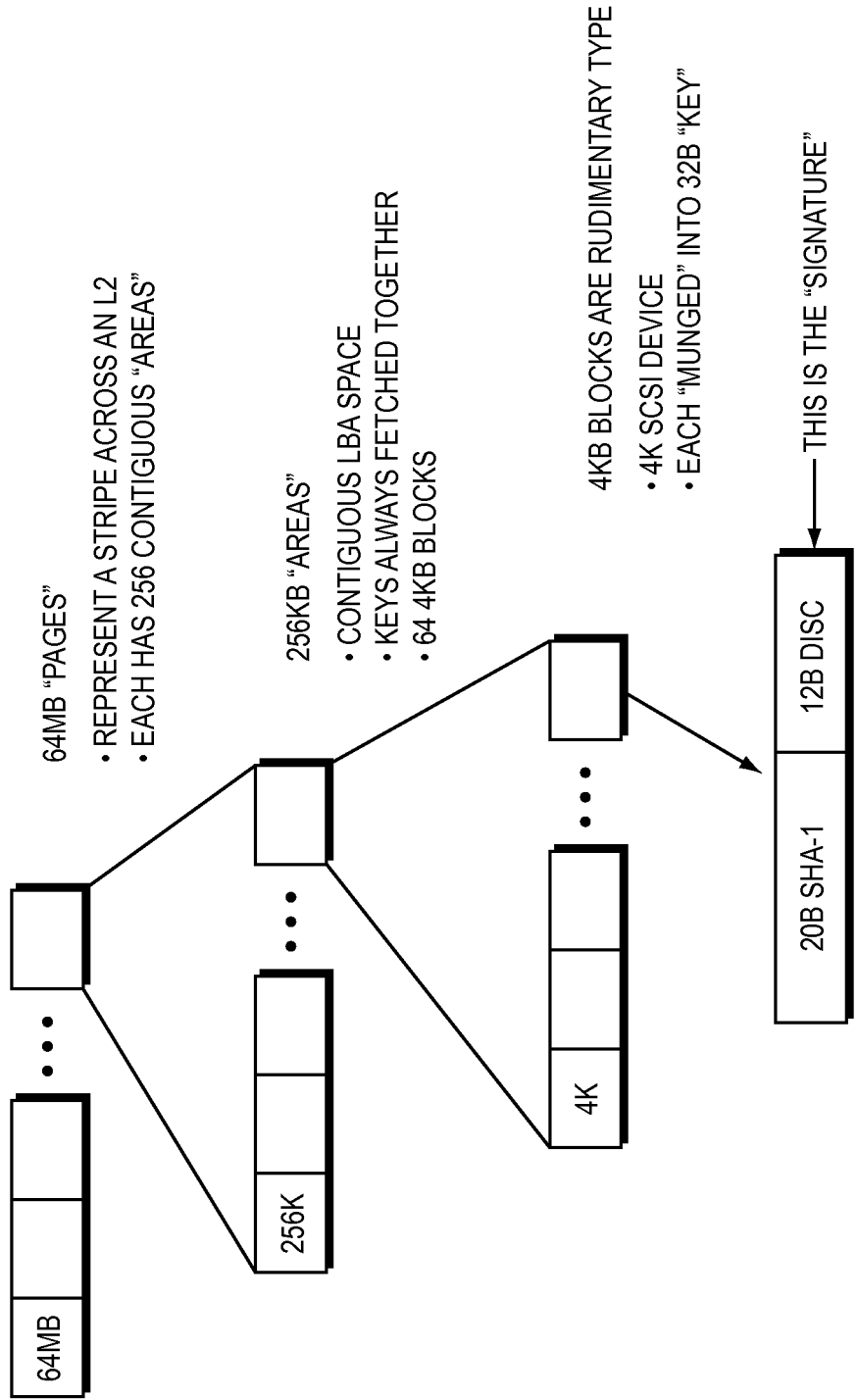
FIG. 2 illustrates one possible format for cache metadata.

FIG. 2 is a more detailed view of the layout of the data and associated metadata in the system. For the following discussion, the cache manager processes (122, 132, 142) cooperate to divide one or more ranges of logical block addresses (LBAs) ultimately provided by cloud storage 140 into a number of portions. Each such portion may may include a number of pages. In the example here, the pages may be 64 megabytes (MB) in length. In turn, the pages pages may be further divided into areas, such as 256 kilobyte (KB) areas. The areas may be further divided into 4 KB blocks. The 4 KB blocks may be a fundamental data block size which corresponds, for example to the block size of a physical device such as a Small Systems Computer Interface (SCSI) compatible storage device.

When new data is ready to be written, a specific address within the contiguous global memory space needs to be identified. This address may be defined by a logical block address (LBA) that may be an offset from the beginning of a designated page. However upon receiving data to be written to a specific address, the data may be processed by the cache manager to assign the data to one of a number of different logical address locations based on an algorithm. For example the cache manager may process the data with a hashing algorithm, such as a SHA-1 algorithm, to determine a key value. Each cache manager may then maintain a map to associate the LBAs to the corresponding key values, and to thus associate the key values to a logical address location for the data.

In the preferred implementation, to determine a physical location for storing data, each 4 KB block is submitted to a hashing algorithm such as in SHA-1 algorithm, resulting in a 20 byte value representing the data. As will be described below, a 12 byte discriminator is added to the hash to determine a signature for the data. These signatures are managed as metadata separately from the data, so that a given cache level may not necessarily have the same number of signature entries in its LBA map as it does actual data.

FIG. 3A illustrates a typical master volume map 300. Each Logical Block Address (LBA) 301 in the map has an associated 32 byte signature 302; each signature 302 is associated with a physical locator 303 for the data. In particular, a given signature may in turn point to a block stored in the L2, L3 or L4 cache. The L3 layer is responsible for maintaining a global map for all LBAs to make the available addresses appear continuous to the initiator L1, regardless of whether the requested data location is present in the L2 cache, the L3 cache, or the cloud.

Figure 3B:
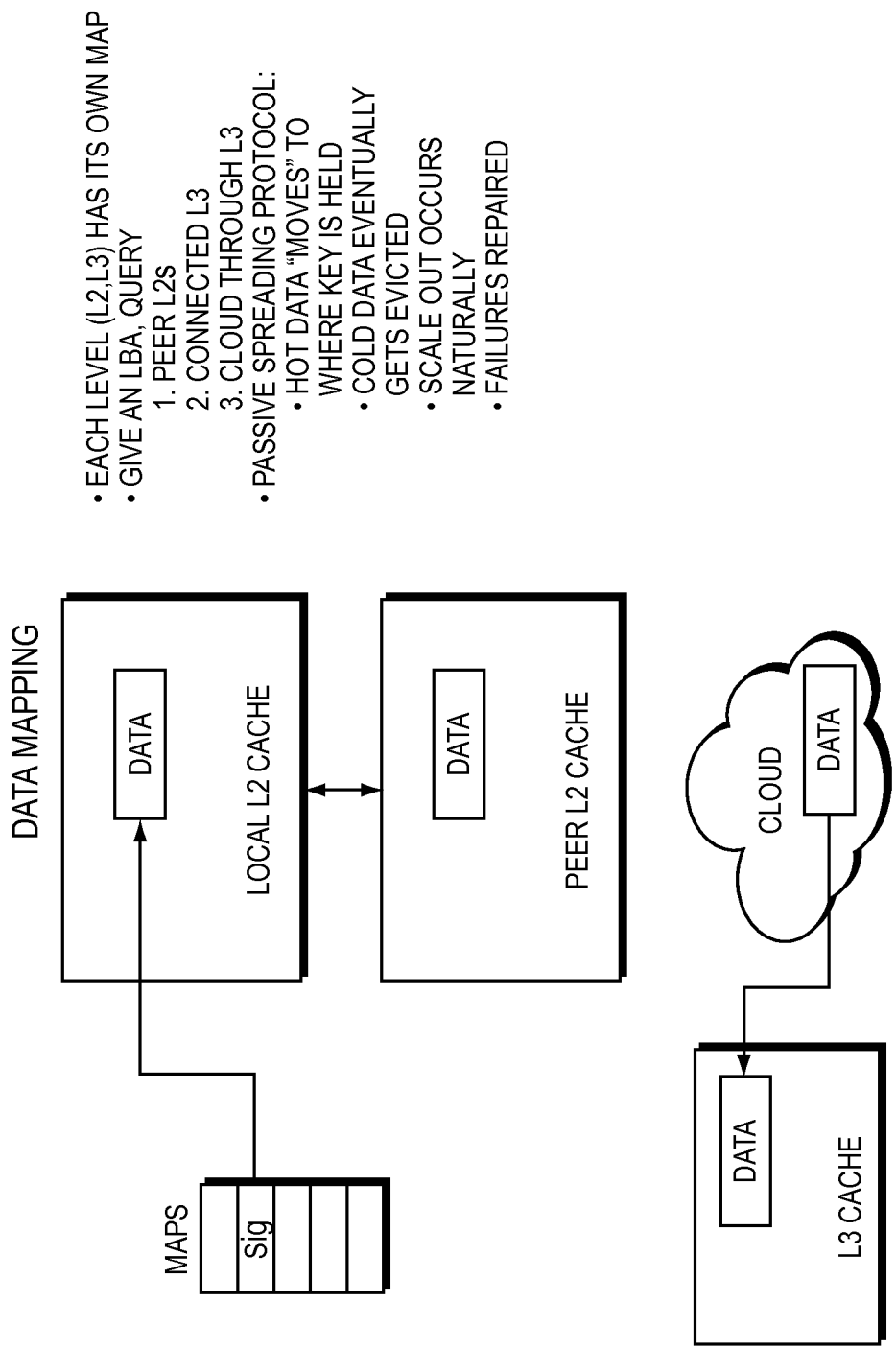
FIG. 3B illustrates data mapping in more detail.

Because each level of the cache has access to its own associated copy of the global volume map, L2 can proceed as shown in FIG. 3B to locate data. For example given an LBA, if a specific L2 cache does not have the requested data, then the specific L2 can query its peer L2 s to see if any of them have the data. If other peer L2 has the requested data, the original L2 can then query the L3 cache; and if L3 does not have the data it then query the cloud. The result is a passive data "spreading" protocol such that hot data moves to wherever the key is held, and cold data eventually gets evicted to the cloud.

Figure 4:
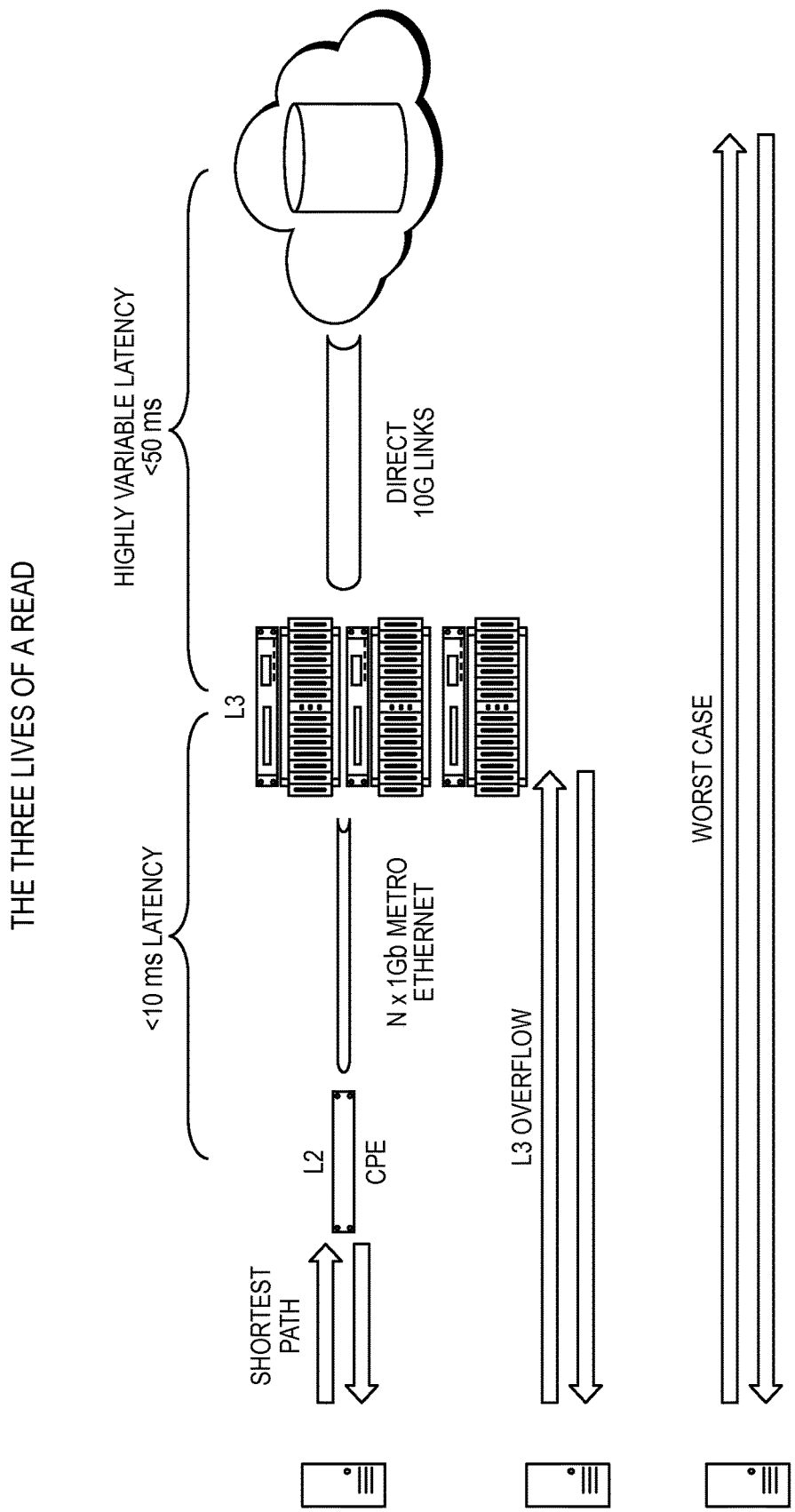
FIG. 4 illustrates a read operation.

FIG. 4 is a high level flow for a read operation. As shown, a read may be satisfied any of three levels in the system including L2 (the shortest path), L3 (occurring with approximate 10 ms latency) or at the cloud level (a worst-case scenario incurring a highly variable latency of 50 ms or more).

Because there is a tendency in most data processing applications to read back data that has recently been written, most of the time reads will be satisfied at either L2 or L3.

Figure 5:
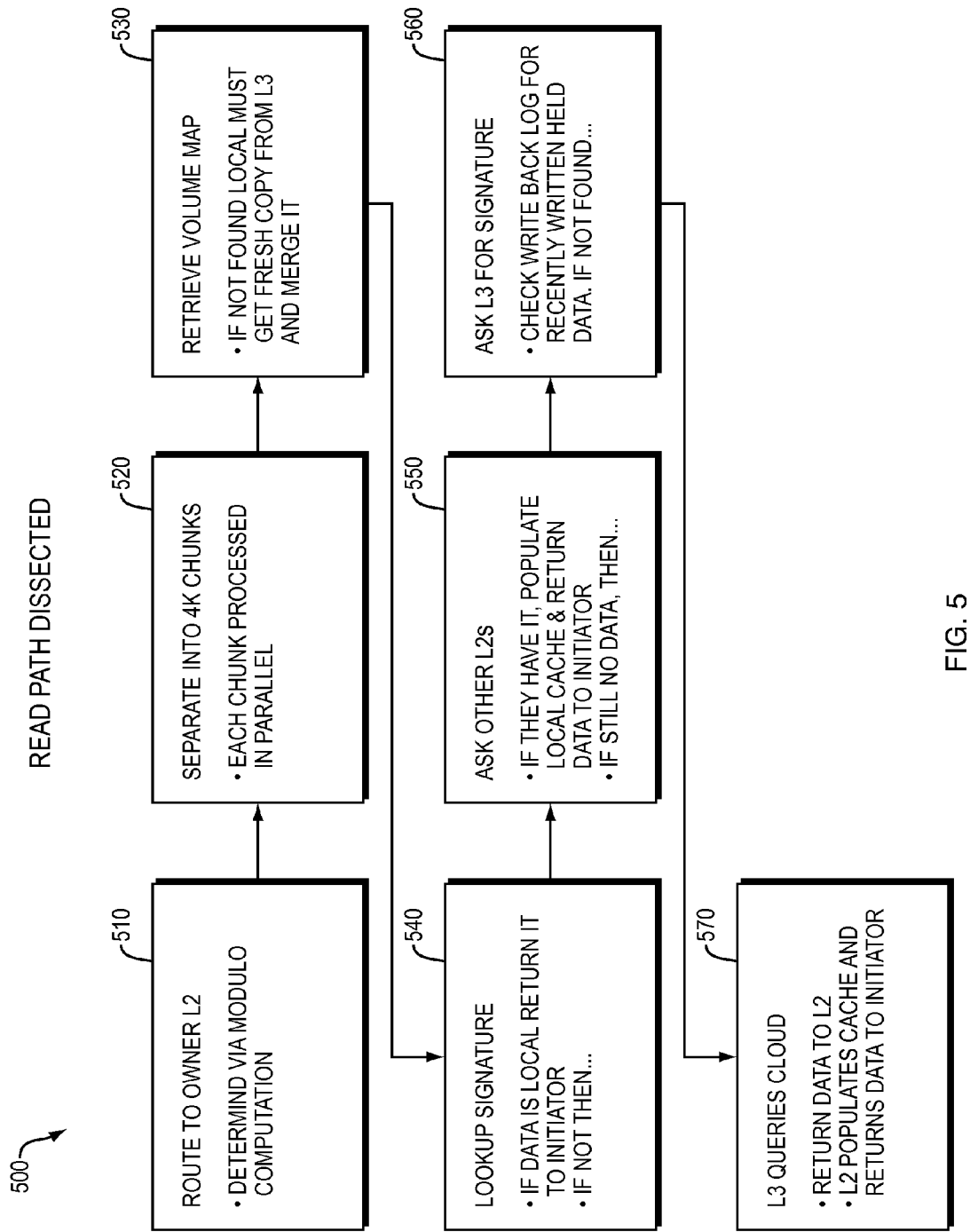
FIG. 5 is a more detailed flow for the read path including operations performed by the L2 cache.

FIG. 5 is a more detailed flow 500 of a read operation. In a system with a multiple peer level L2's, a first step 510 may be to determine which of several peer L2s is responsible for this particular data block. This may be determined bya modulo computation on the LBA. If for example, there are eight available L2 devices, the lowest order three bits of the LBA may be used to determine a specific L2 device to perform the next steps.

A next step 520 is performed by the L2 cache device (such as the L2 device selected via the modulo operation in step 510) to separate the data into 4 KB chunks. Each chunk is then processed (in parallel if possible) to determine a hash key. For each chunk, a volume map associated with the LBA is retrieved from the LBA map kept locally by that device. If there is no entry for the LBA in the local map, then it is concluded that the data is not stored at L2 and it will have to be retrieved from L3.

A next step 540 is to look up the signature associated with the LBA from the volume map. If the data is local, then data can be returned to the initiator from the L2 cache.

It is possible for a given L2 device to own a range of LBAs, but to not actually have the requested data stored in its cache. This may occur, for example, if multiple copies of the same data happen to exist. If indeed the requested data is not local to the L2 selected via the modulo operation, in step 550 the other peer L2's are asked if they have the data. If one of the other L2 caches does have the requested data, the other peer L2 device having the data can update its local cache and return the data to the initiaor.

If however, no other peer L2 caches have the data, step 560 sends the request to L3 and asks L3 for the data associated with the signature. At this point the write back log at L3 will be checked for recently written, but still held data that hasn't yet been pushed to the cloud 140. If data is found in the write back log, it can be returned from there. However, if the requested data is not found in L3, then in step 570 L3 will have to query the cloud. Upon retrieving the data from the cloud, L3 will then return it to L2 with an identifying signature. L2 can then populate its local cache memory and return the data to L1.

Figure 6:
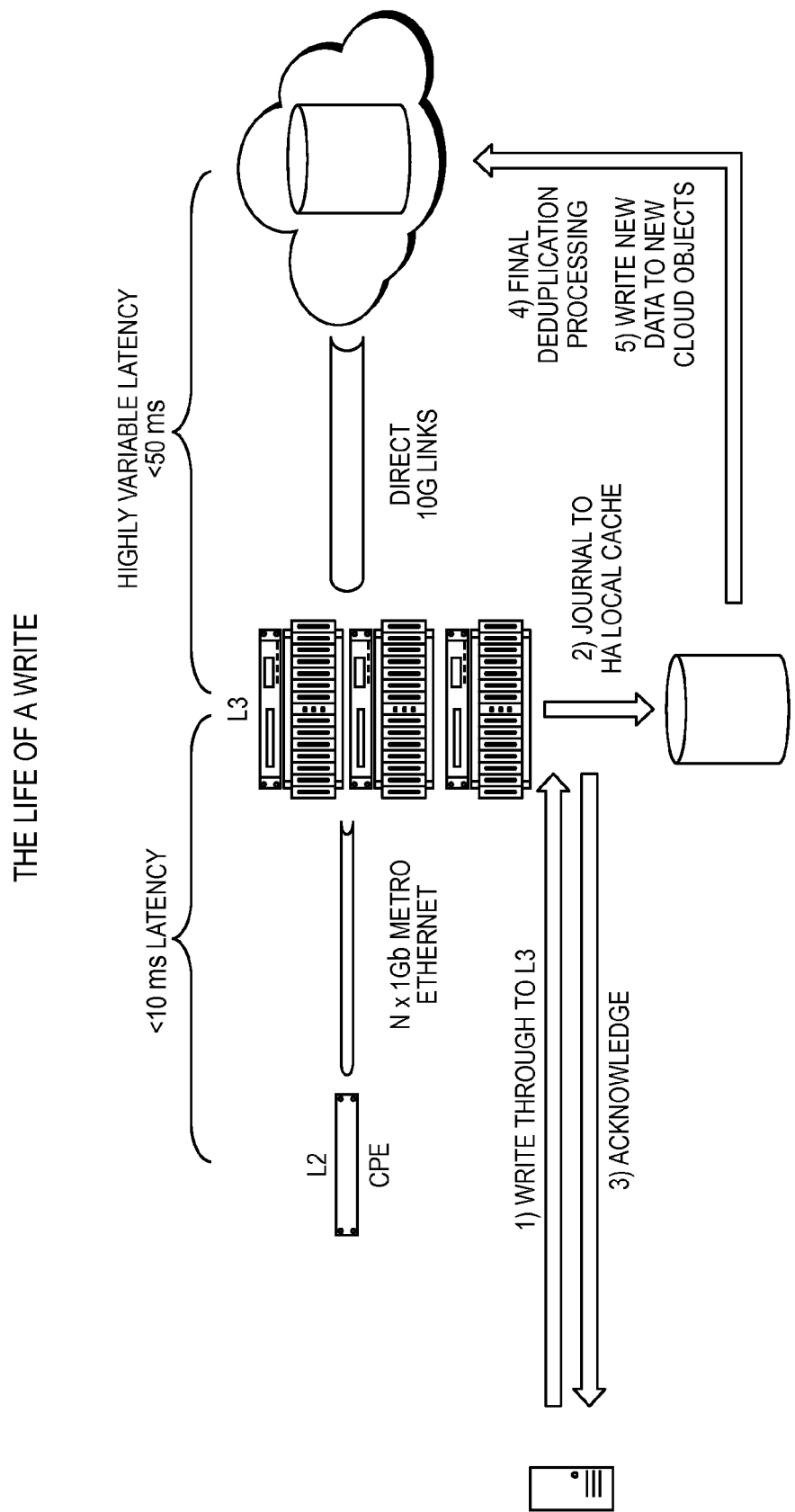
FIG. 6 is a high-level flow diagram illustrating the life of a write operation.

FIG. 6 is a high-level flow diagram of a write operation. In general, the coordinating node L3 is the master for maintaining all signature to LBA mappings, for all levels in the cache hierarchy. In general, if an L2 cache cannot satisfy a write then it performs a write through to L3, passing the data to L3. L3 therefore operates as a coordinating node such it will always satisfy all writes without L2 incurring a round trip delay to the L4 cloud level. Thus L3 will acknowledge the write back to L2 such that L2 experiences (for example, at a worst-case 10 ms latency). In the case of an L3 miss, L3 creates a journal entry and the data is temporarily stored in L3's own cache as a journal entry for subsequent processing. L3 will then push the data to the cloud 140 with optional possible de-duplication as time permits. This writing of new data can occur as a background process over the highly variable latency links to the cloud 140, therefore isolating L2 from any L3 to cloud latency.

The size of the cache local to L3 can thus be limited to the expected size of the journaling entries needed to handle the temporary storage of data resulting from such L3 misses.

Figure 7:
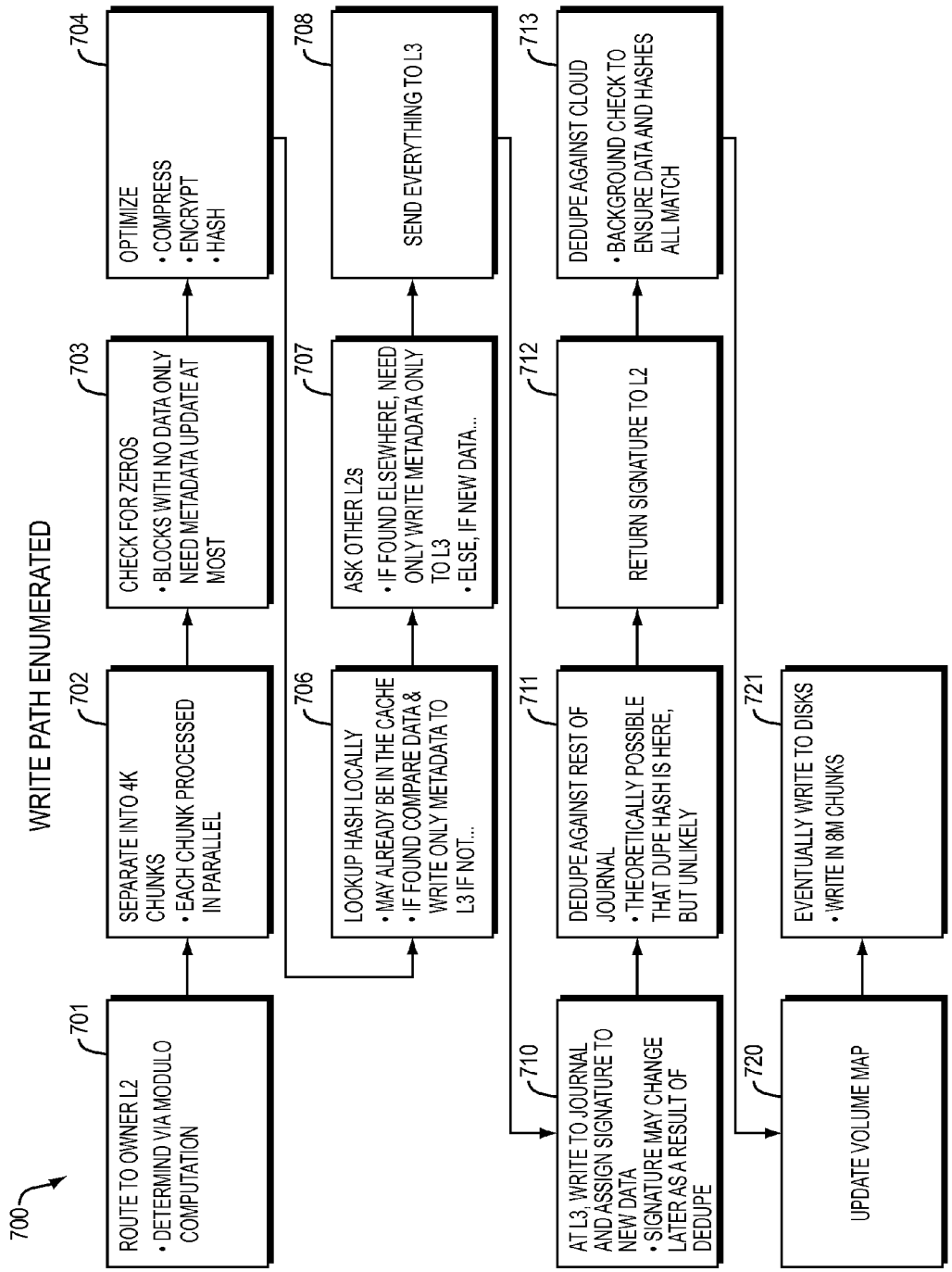
FIG. 7 is a more detailed diagram showing write path operations performed at both the L2 and L3 cache.

FIG. 7 is a more detailed write process flow 700. Steps 701-708 are performed at the L2 peer cache devices(s); steps 710-713 are performed at the L3 coordinator node, and steps 720-721 are performed back at L2.

More particularly, in state 701 a write request has been routed to an L2. The L2 is determined via modulo computation on the LBA that came in with the write request.

In step 702 the incoming data is separated into 4 KB chunks with each chunk processed in parallel, if possible. In step 703 the data chunk is checked for zeros. Blocks having no data other than zeroes only need a metadata update at most. In step 704, the data block is optimized such as by compressing or encrypting it. Keeping L2 responsible for any compressiong or encryption algorithms provides an advantage in that the operator of the L3 coordinator node need not be involved in any encryption/decryption algorithms associated encryption key management, and the like. This provides a preferred arrangement where an enterprise may be a customer of the operator of the L3 coordinator node located at a site remote from the customer premises. In such an environment, encryption or compression can remain the responsibility of the customer premise equipment.

In any event, the L2 device selected via the modulo computation is then responsible for calculating a SHA-1 hash for the new data.

In step 706, the hash is looked up locally. This is because the data, even though "new" data, may already be available somewhere in the local L2 caches as a result of a prior access. If in step 706, the data is found locally, only the metadata associated with the request is written to L3. Thus, for example, even when if the write is satisfied at L2, L2 still needs to inform L3 so that L3 can update its global LBA maps if necessary.

If however the data is not in the L2 cache, then in step 707 other peer L2's are asked if they have the data. If they do have the data, then the peer L2 needs only write the metadata to L3.

However, if the data has not been seen before, then everything (the LBA, the data, and the calculated SHA-1 hash) is sent to L3 in step 708. As will be explained below, metadata maps are smaller in L2 then in L3, but the physical amount of storage available in L2 may be quite a bit larger than the physical storage available in L3.

Processing then proceeds at L3 in step 710. The first step in 710 is to write an entry for the new write access to L3's local journal and assign a new signature to the new data. The signature may be determined by adding a unique discriminator to the hash as described below. It is understood that this signature may change later as a result of a de-duplication operation. In any event L3 will obtain a new hash and append a unique discriminator to arrive at a signature to be associated with the map entry for the LBA being processed. In step 711 duplication is performed against the rest of L3's journal. In particular the new signature is compared against existing signatures for journaled operations. If the signatures are the same, and the data is the same, then the references are the same and they can be consolidated. For example, it is okay for the same data to be pointed to by two different signatures.

In a next step 712, the new signature for the data is returned to L2 so that L2 will then update its own LBA map. In step 713, a deduplication operation can be performed against the cloud as a background check to ensure that data hashes match. For example, if multiple hashes point to the same block of data as the block determined by the new signature, then these may need to be consolidated in the global LBA map.

Step 713 is taken since there is potentially a very large amount of data in the cloud any duplicates shoud be adjusted to fix the global LBA map. For example, it is possible that the amount of data in the cloud far exceeds what can be cached in L2 and L3. The fact that a piece of data appears unique at this stage does not mean that there isn't already a copy of it in the L4 cloud level. If the data were previously ingested and had grown cold for example, it could be out at the L4 level. The point of back end "lazy" deduplication here is to determine if there is another previously seen instance of that hash. If it is found, then this step should choose which signature will be used as the correct one and remove instances of any others.

Processing then returns to L2 in step 720 where L2 will update its own local map with the new signature now associated to the LBA L2 will then write the new data to its local disk.

It can now be understood how the L3 cache acts to correct for latency incurred in cloud storage access. Effectively, in addition to L3 acknowledging all write requests before they get to the cloud, L3 also receives map updates from the L2 caches when a write is satisfied locally at L2. The L3 caches is also smart enough not to transmit duplicate writes to the cloud.

2. Decoupling of Data and Metadata for Each Level

Metadata maps 124 maintained for L2 need to be high-performance since they are in line, in the critical path to satisfying a read or write request from L1. These metadata maps are are thus preferably retained in high speed solid state memory as opposed to being maintained in disk storage.

As explained above already, the data stores 123, 133, 143 at each level typically presents logical block back to the initiator as opposed to physical blocks. Each logical block has an associated metadata map 124, 134, 144 that determines where the underlying physical block is located or whether a physical block is even actively mapped (such as in the case of a thinly provisioned storage unit). In the procedure preferred here, each level separately stores its data and metadata.

Figure 8A:
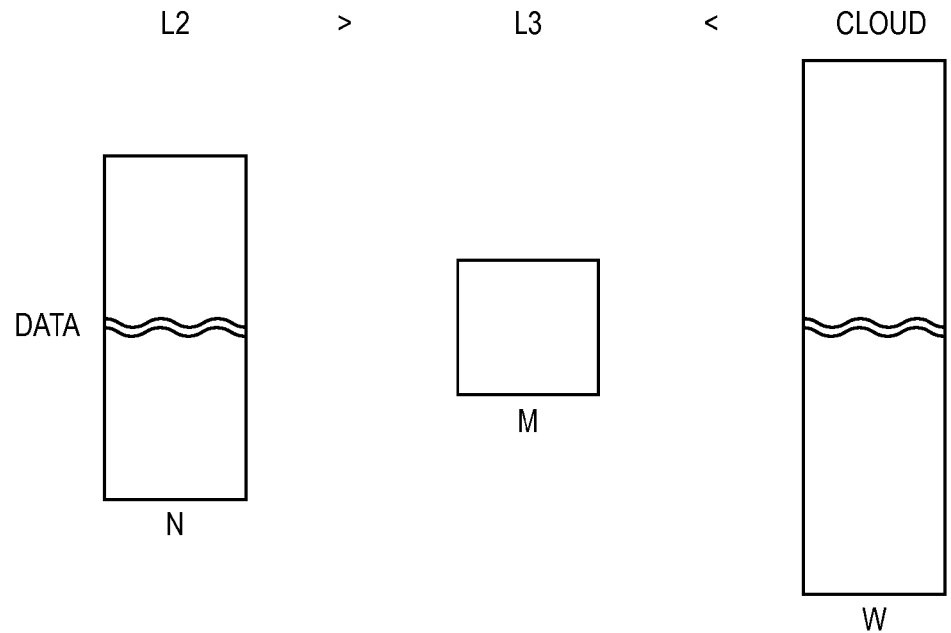
FIGS. 8A and 8B respectively show relative sizes for data and metadata at the L2, L3 and cloud level.

In the example of FIG. 8A, the L2 caches may contain for example N physical locations in its local data store 123. The L3 cache however maybe somewhat smaller, storing only M physical locations in its data store 133. The cloud however may have a much great number of contiguously addressable locations W. where W is much greater than N. Thus a large amount of data may be actively kept in L2, with the coordinating node L3 storing quite a bit less data, and the cloud L4 potentially storing the entire continuously addressable space. This in effect decouples the amount of data stored at L2 from the amount of data stored at L3. The L2 caches can be sized to optimize the service they provide to the L1 intiators—and now the L3 cache need only be large enough to maintain write-back consistency as dicated by the needed size for L3's log to compensate for round trip latency between L3 and L4. L3's cache need not be a superset of everything stored at the L2 caches.

Figure 8B:
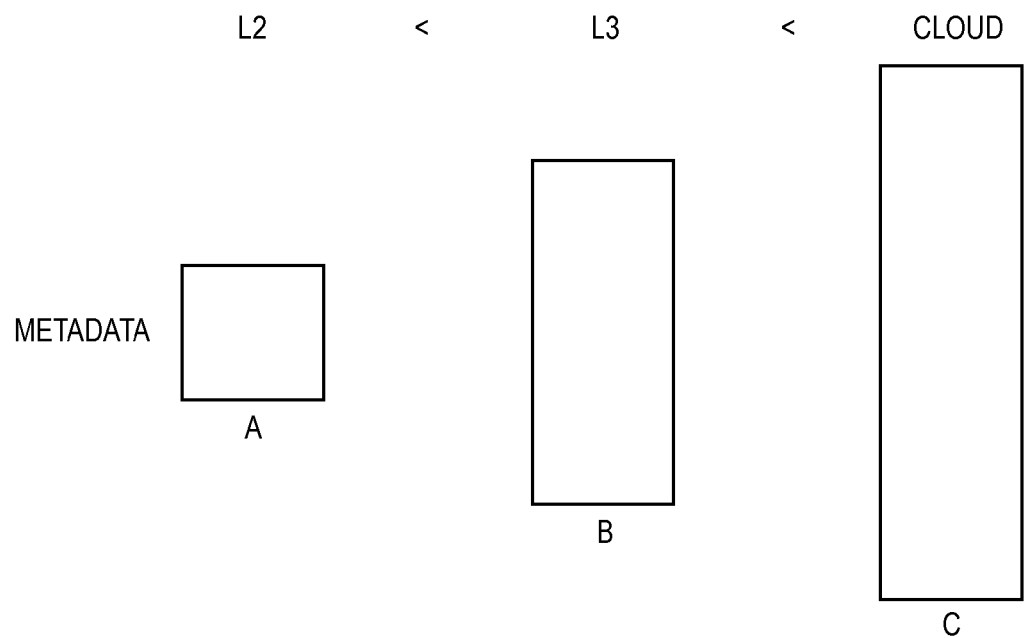

This structure is also complimented by metadata structures as shown in FIG. 8B, where the metadata maps still progressively increase in size with distance from the initiator. Thus for example the metadata cache at L2 is smaller than the L3 metadata cache which in turn is smaller than the metadata cache for the cloud level.

We have found that this assymetric, decoupled allocation of data and metadata provides advantages. By maintaining a large amount of reusable data in L2, the system can support larger number of different LBA maps 124 (such as for the different initiators that it serves at the same time). Allowing for more metadata to be swept back and forth between L2 and L3 is a minimal penalty, because each metadata piece consists of only the 32 byte block signature as opposed to at least a 4 KB chunk of data.

This architecture further allows use optimization of the L2 to L3 network link 160 minimizing the amount of data kept at L2 and thus minimizing the amount of data it must transfer to L3. This arrangement also helps ensure that when L3 does reach into the cloud, it will incur only a single round-trip delay.

With the L2 metadata maps 124 still being relatively small, they can now be kept in high performance semiconductor flash memory providing the ability to process it at wire speed, to minimize latency between L2 and the initiator.

3. L3 Adds a Discriminator to the Hash Determined by L2

Hash functions are a type of checksum function that generate a relatively small key from a larger block of data. For example, an MD-5 hash generates a 128 bit key and SHA-1 generates a 160 bit key. These hash keys are extremely useful since they allow determining whether two data blocks are different simply by comparing their much smaller hash values.

It is mathematically possible for two different data blocks to have the same hash key, but with 128 bit keys the likelihood of a collision is generally considered to be less than the likelihood of an undetected disk error. Some vendors thus conclude it is safe to assume that no two blocks will ever have hash out to a duplicate key. However in reality with very large cloud based data sets this becomes a untenable assumption.

Figure 9:
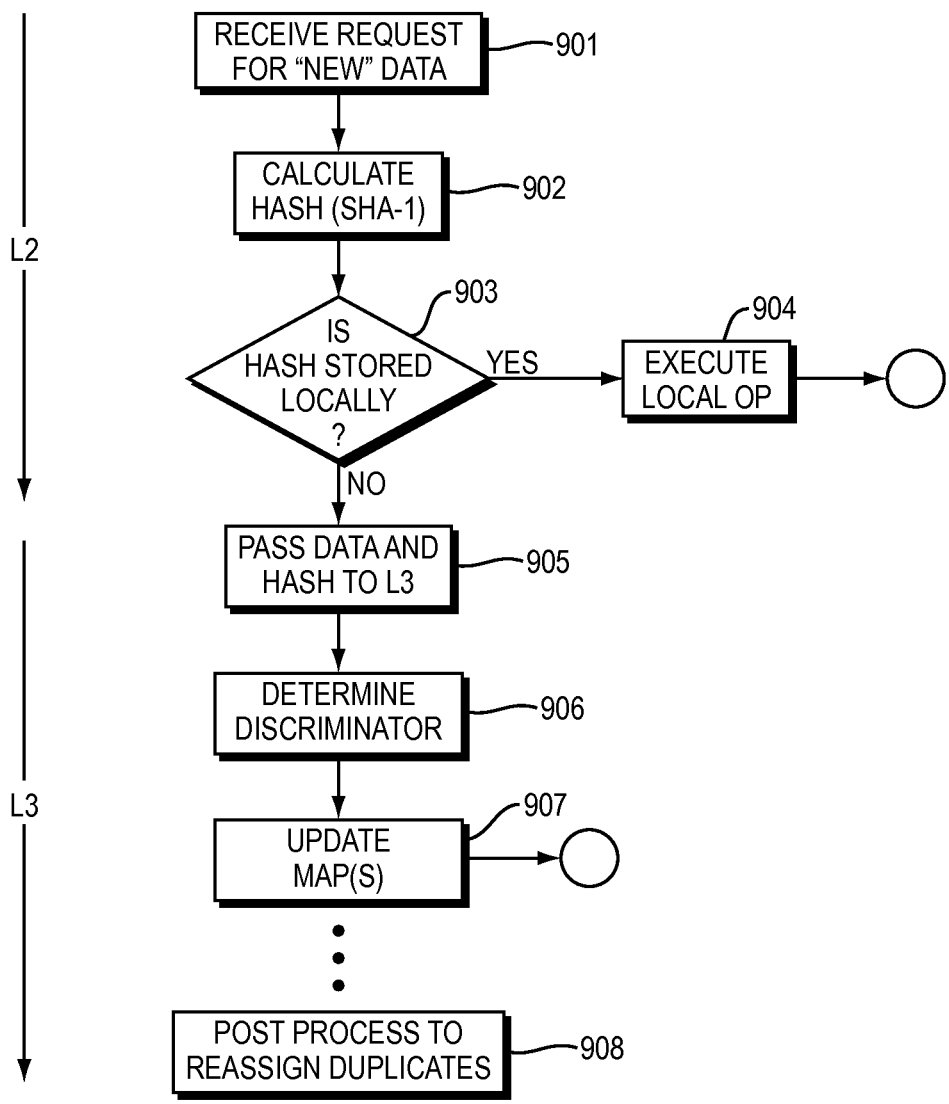
FIG. 9 is a flow diagram of operations performed by the L3 cache to determine a signature and how to post-process duplicates.

The preferred solution to this problem as shown in FIG. 9 is to add a unique signature, or discriminator to each hash. Thus when a new block is to be written to the system, a hash is computed. That has is then compared with existing hashes. If one or more existing duplicate hashes are found, the underlying blocks of data are compared for a data match. If a match is found, the new block is assigned the same key value as the matching block, otherwise the new block is assigned a new key. The new key will have the computed hash value plus a unique discriminator. The determined unique discriminator may be a monotonically increasing number, a time of day indicator, some other uniquely incrementing value, or a value that depends on something else that is likely to be unique, such as a volume identifier associated with the access request.

In one preferred arrangement shown in FIG. 9, in step 901 the L2 node receives a request to store new data. L2 then performs a hash, such as SHA-1, on the data in step 902. L2 then examines its local map in step 903 to see if it had the same hash stored locally. If it does then it can in step 904 use the signature that has already been assigned. However, if it does not already have the same hash, then the data and hash are passed to L3 in step 905. In step 906, L3 will then assign a discriminator and append it to the hash in step 907. This discriminator can be any unique value, such as a constantly incrementing value, or a Coordinated Universal Time (UTC) value, or a value that depends on a volume identifier associated with the LBA. An additional use may be made of specifica types of discriminator values. For example, the L4 cloud 140 may decide to assign LBAs that have a similar time stamp, or a similar volume identifier, to a specific available physical storage device. Such coordinated assignment of LBAs may make data retrieval at L4 more efficient.

It is then L3's job in step 908 to make sure that it has not at sometime in the past run across the same signature (hash plus discriminator) before updating the global LBA map.

L2 thus acts as a hash code filter in this way. This process works well as a filter because the L2 cache is disproportionately larger than the L3 cache.

What is claimed is:

1. A coordinator node apparatus for operating on data blocks comprising:
   a first interface, connected to a Level 2 (L2) cache storage endpoint over a first network connection;
   a second interface, connected to cloud storage over a second network connection, the first and second network connections further such that a physical distance between the coordinator node and the L2 cache storage endpoint is shorter than a physical distance between the coordinator node and the cloud storage;
   a local Level 3 (L3) cache storage; and
   a processor for responding to a block write request from the L2 cache storage endpoint as a write back cache, by acknowledging the block write request to the L2 cache storage endpoint even if a data block associated with the write request is not presently stored in the local L3 cache storage;
   storing the data block and metadata associated with the block write request in the local L3 cache storage, before forwarding the data block and metadata associated with the block write request to the cloud storage;
   maintaining a global logical block address (LBA) metadata map; and
   distributing the global LBA metadata map to the L2 cache storage endpoint and to the cloud storage.

2. The apparatus of claim 1 wherein the first network connection to the L2 storage endpoint is a local area network connection or a metropolitan area network connection.

3. The apparatus of claim 1 wherein the second network connection to the cloud storage is a wide area network connection.

4. The apparatus of claim 3 wherein the cloud storage is provided by a service accessible over the wide area network connection.

5. The apparatus of claim 1 wherein a variability in latency associated with the first network connection is one-third or less of a variability in latency associated with the second network connection.

6. The apparatus of claim 1 wherein the processor is further for assigning a signature to a data block, and maintaining, in the global LBA metadata map, metadata that specifies (a) a mapping between at least one of the LBAs and the signature, and (b) a mapping between the signature and a logical address for the data block.

7. The apparatus of claim 1 wherein the L2 storage endpoint comprises two or more devices each storing a portion of the LBAs assigned by the global LBA metadata map.

8. The apparatus of claim 1 wherein the processor further deduplicates the data block in the local L3 cache storage before forwarding the data block to the cloud storage.

9. The apparatus of claim 1 wherein the processor further, upon receiving a read request from the L2 cache storage endpoint, searches the local L3 cache storage for a data block associated with the read request that was stored from a prior write request before requesting the data block from the cloud storage.

10. The apparatus of claim 1 wherein the L2 cache storage endpoint further operates as a write-through cache for access requests received from Level 1 (L1) storage devices.

11. The apparatus of claim 10 wherein acknowledging the write request to the L2 cache storage endpoint also isolates the L1 storage devices from a latency associated with storing the data associated with the write request to the remote cloud storage.

12. The apparatus of claim 1 wherein the processor further receives updates to the global LBA metadata map from the L2 cache storage endpoint.

13. A method comprising:
accessing a storage device providing a Level 3 (L3) cache;
connecting to a Level 2 (L2) cache storage endpoint over a first network connection;
connecting to remote cloud storage over a second network connection;
the first and second network connections such that a physical distance between the L3 cache and the L2 cache storage endpoint is shorter than a physical distance from the L3 cache to the remote cloud storage;
responding to a block write request from the L2 cache storage endpoint as a write back cache, by acknowledging the block write request to the L2 cache storage endpoint even if a data block associated with the write request is not presently stored in the local L3 cache;
storing the data block associated with the write request and block-related metadata in the local L3 cache before forwarding the data block associated with the write request and the block-related metadata to the remote cloud storage;
maintaining a global logical block address (LBA) metadata map; and
distributing the global LBA metadata map to the L2 cache storage endpoint and to the remote cloud storage.

14. The method of claim 13 wherein the first network connection is a local area network connection or a metropolitan area network connection.

15. The method of claim 13 wherein the second network connection is a wide area network connection.

16. The method of claim 15 wherein the remote cloud storage is provided by a service accessible over a wide area network connection.

17. The method of claim 13 wherein a latency associated with the first network connection varies over a time that is one-third or less of a time over which a latency associated with the second network connection varies.

18. The method of claim 13 further comprising steps of:
assigning a signature to the data block, and
maintaining in the global LBA metadata map, a mapping between at least one of the LBAs and the signature, and a mapping between the signature and a logical address for the data block.

19. The method of claim 13 wherein the L2 storage endpoint comprises two or more devices each such device further storing a portion of the LBAs assigned by the global LBA metadata map.

20. The method of claim 13 further comprising:
deduplicating the data in the local L3 cache before forwarding the data block associated with the write request to the remote cloud storage.

21. The method of claim 13 further comprising:
upon receiving a read request from the L2 cache storage endpoint, searching the local L3 cache for a data block associated with the read request that may be stored from a prior write request before requesting the data block from the cloud storage.

22. The method of claim 13 further comprising the step of:
at the L2 cache storage endpoint, responding to write requests received from a level 1 (L1) storage device as a write-through cache.

23. The method of claim 22 wherein acknowledging the write request to the L2 cache storage endpoint also isolates the L1 storage devices from a latency associated with storing the data associated with the write request to the remote cloud storage.

24. The method of claim 13 additionally comprising:
in response to the L2 cache storage endpoint satisfying a write request, receiving updates to a portion of the global LBA metadata map from the L2 cache storage endpoint.

* * * * *